(12) United States Patent
Lewczyk et al.

(10) Patent No.: US 12,509,565 B2
(45) Date of Patent: Dec. 30, 2025

(54) BIODEGRADABLE FOAMS AND METHODS OF FOAM PRODUCTION

(71) Applicant: CRUZ FOAM, INC., Santa Cruz, CA (US)

(72) Inventors: William Thomas Lewczyk, Santa Cruz, CA (US); Juan Manuel Bravo, Santa Cruz, CA (US)

(73) Assignee: Cruz Foam, Inc., Santa Cruz, CA (US)

( * ) Notice: Subject to any disclaimer, the term of this patent is extended or adjusted under 35 U.S.C. 154(b) by 705 days.

(21) Appl. No.: 17/894,012

(22) Filed: Aug. 23, 2022

(65) Prior Publication Data

US 2023/0064882 A1 Mar. 2, 2023

Related U.S. Application Data

(60) Provisional application No. 63/236,586, filed on Aug. 24, 2021.

(51) Int. Cl.
| | | |
|---|---|---|
| *C08J 9/00* | (2006.01) | |
| *B29C 48/00* | (2019.01) | |
| *B29K 75/00* | (2006.01) | |
| *B29K 105/04* | (2006.01) | |

(52) U.S. Cl.
CPC ......... *C08J 9/0061* (2013.01); *B29C 48/0012* (2019.02); *C08J 9/0066* (2013.01); *B29K 2003/00* (2013.01); *B29K 2075/02* (2013.01); *B29K 2105/04* (2013.01); *B29K 2995/006* (2013.01); *C08J 2303/02* (2013.01)

(58) Field of Classification Search
CPC .... C08J 9/0061; C08J 9/0066; C08J 2303/02; B29C 48/0012; B29K 2003/00; B29K 2075/02; B29K 2105/04; B29K 2995/006
See application file for complete search history.

(56) References Cited

U.S. PATENT DOCUMENTS

| | | |
|---|---|---|
| 5,011,864 A | 4/1991 | Nielsen et al. |
| 5,256,702 A | 10/1993 | Grigat et al. |
| 5,736,586 A * | 4/1998 | Bastioli ............... B29C 48/625 521/84.1 |
| 5,756,111 A | 5/1998 | Yoshikawa et al. |

(Continued)

FOREIGN PATENT DOCUMENTS

| | | |
|---|---|---|
| CN | 1112143 A | 11/1995 |
| CN | 1410452 A | 4/2003 |

(Continued)

OTHER PUBLICATIONS

International Search Report and Written Opinion, mailed Feb. 16, 2023, in corresponding International Patent Application No. PCT/US2022/075364, 14 pages.

(Continued)

*Primary Examiner* — K. Boyle
(74) *Attorney, Agent, or Firm* — Christensen O'Connor Johnson Kindness PLLC (57) ABSTRACT

A foam comprising starch and urea is described. A composition of the foam, by weight percent, includes a starch weight percent representative of the starch included in the foam and a urea weight percent representative of the urea included in the foam. The starch weight percent is greater than the urea weight percent.

16 Claims, 5 Drawing Sheets

(56) References Cited

U.S. PATENT DOCUMENTS

| | | | |
|---|---|---|---|
| 6,184,261 B1* | 2/2001 | Biby | C08J 9/0061 521/84.1 |
| 7,041,369 B1 | 5/2006 | Mackey et al. | |
| 8,114,919 B2 | 2/2012 | Weidinger | |
| 2001/0014702 A1 | 8/2001 | Harfmann et al. | |
| 2002/0068139 A1 | 6/2002 | Polak et al. | |
| 2003/0021921 A1 | 1/2003 | Debraal et al. | |
| 2003/0143388 A1 | 7/2003 | Reeves et al. | |
| 2003/0155679 A1 | 8/2003 | Reeves et al. | |
| 2004/0197545 A1 | 10/2004 | Gehlsen et al. | |
| 2005/0202229 A1 | 9/2005 | Ozasa et al. | |
| 2006/0293418 A1 | 12/2006 | Matuana et al. | |
| 2007/0292643 A1 | 12/2007 | Renn | |
| 2009/0214853 A1 | 8/2009 | Quist et al. | |
| 2009/0263601 A1 | 10/2009 | Renn | |
| 2011/0059162 A1 | 3/2011 | Reed et al. | |
| 2012/0077012 A1 | 3/2012 | Liu et al. | |
| 2013/0287836 A1 | 10/2013 | Ingber et al. | |
| 2014/0256925 A1 | 9/2014 | Catchmark et al. | |
| 2015/0057368 A1 | 2/2015 | Connelly et al. | |
| 2015/0299383 A1 | 10/2015 | Trumbo et al. | |
| 2015/0374877 A1 | 12/2015 | Guo et al. | |
| 2016/0168311 A1 | 6/2016 | Cuero Rengifo et al. | |
| 2016/0207251 A1 | 7/2016 | Cik | |
| 2020/0239670 A1 | 7/2020 | Rolandi et al. | |

FOREIGN PATENT DOCUMENTS

| | | | |
|---|---|---|---|
| CN | 1523049 A | * | 8/2004 |
| CN | 1628865 A | | 6/2005 |
| CN | 1800249 A | | 7/2006 |
| CN | 101381500 A | | 3/2009 |
| CN | 101974189 A | | 2/2011 |
| CN | 101654537 B | | 3/2011 |
| CN | 101301491 B | | 6/2011 |
| CN | 103012836 A | | 4/2013 |
| CN | 103709452 A | | 4/2014 |
| CN | 104558677 A | | 4/2015 |
| CN | 110812769 A | | 2/2020 |
| EP | 0747420 A1 | | 12/1996 |
| EP | 3487922 A1 | | 5/2019 |
| EP | 3794068 A1 | | 3/2021 |
| KR | 960004436 B1 | | 6/1993 |
| WO | 2012030805 A2 | | 3/2012 |
| WO | 2013131079 A1 | | 9/2013 |
| WO | 2018017837 A1 | | 1/2018 |
| WO | 2019217268 A1 | | 11/2019 |
| WO | 2021086787 A | | 5/2021 |

OTHER PUBLICATIONS

Invitation to Pay Additional Fees and, where applicable, Protest Fee, mailed Oct. 20, 2022, in corresponding International Patent Application No. PCT/US2022/075364, 2 pages.

Emilia Szymańska, et al, Stability of Chitosan—A Challenge for Pharmaceutical and Biomedical Applications, Marine Drugs, Published Apr. 1, 2015, vol. 13, pp. 1819-1846.

Duan, Natural Macromolecules (Chinese), Huazhong University of Science and Technology Press, Edition 1, p. 192, Mar. 31, 2016.

Beijing Plastic Industry School, China Light Industry Press, Plastic Molding Equipment 1st Addition, Aug. 31, 2007, pp. 1-4 (pp. 115-116).

ASTM Int'l Standard Designation: D1621-10, Standard Test Method for Compressive Properties of Rigid Cellular Plastics, Apr. 2010, 5 pages.

ASTM Int'l Standard Designation: D1622/D1622M-14, Standard Test Method for Apparent Density of Rigid Cellular Plastics, Apr. 2014, 4 pages.

ASTM Int'l Standard Designation: D1623-09, Standard Test Method for Tensile and Tensile Adhesion Properties of Rigid Cellular Plastics, Sep. 2009, 7 pages.

ASTM Int'l Standard Designation: D3575-20, Standard Test Methods for Flexible Cellular Materials Made from Olegin Polymers, Feb. 2020, 11 pages.

ASTM Int'l Standard Designation: D3576-15, Standard Test Method for Cell Size of Rigid Cellular Plastics, Oct. 2015, 5 pages.

ASTM Int'l Standard Designation: D6226-15, Standard Test Method for Open Cell Content of Rigid Cellular Plastics, Sep. 2015, 7 pages.

Banerjee et al., Alginate-chitosan composite hydrogel film with macrovoids in the inner layer of biomedical applications, J. Appl. Polym. Sci., Jun. 10, 2019, 9 pages.

Calles-Arriaga et al., Thermal characterization of microwave assisted foaming of expandable polystyrene, Ingenieria investigacion y tecnologia, Jan. 2016, 7 pages.

Castel-Molieres et al., Influence of Homogenization Technique and Blend Ratio on Chitosan/Aliginate Polyelectrolyte Complex Properties, Journal of Medicine and Biological Engineering, v. 38(1); Feb. 2018, pp. 10-21.

Flagel, Mycelium: Using Mushrooms to Make Packaging Materials, https://matmatch.com/blog, Apr. 3, 2020, 21 pages.

Makarios-Laham et al., Biodegradability of chitin- and chitosan-containing films in soil environment, J. Environ Polym Degr 3, (1), Jan. 1995, 6 pages.

Mohandas et al., Exploration of alginate hydrogel/nano zinc oxide composite bandages for infected wounds, International Journal of Nanomedicine Oct. 1, 2015, pp. 53-66.

Li et al., Chitosan-Alginate Nanoparticles as a Novel Drug Delivery System for Nifedipine, International Journal of Biomedical Science, vol. 4, No. 3, Sep. 2008, pp. 221-228.

Rudyardjo et al., The Synthesis and characterization of hydrogel chitosan-alginate with the addition of plasticizer auric acid for wound dressing application, in Journal of Physics: Conference Series May 1 (vol. 853, No. 1, p. 012042) IOP Publishing, 8 pages.

Shigemasa et al., Evaluation of different absorbance ratios from infrared spectroscopy for analyzing the degree of deacetylation in chitin, International Journal of Biological Macromolecules, 18(3) Apr. 1, 1996, 237-42.

Zhao et al., Preparation of Fibrous Chitosan/Sodium Alginate Composite Foams for the Absorption of Cationic and Anionic Dyes, Journal of Hazardous Materials vol. 403, Sep. 22, 2020, pp. 1-10.

* cited by examiner

BIODEGRADABLE FOAMS AND METHODS OF FOAM PRODUCTION

CROSS-REFERENCE TO RELATED APPLICATION

This application claims the benefit of U.S. Provisional Application No. 63/236,586, filed on Aug. 24, 2021, which is hereby incorporated by reference in its entirety.

TECHNICAL FIELD

This disclosure relates generally to foam and methods of foam production, and in particular but not exclusively, relates to biodegradable foam

BACKGROUND INFORMATION

Plastic pollution is hazardous to life on earth. Plastic may take hundreds of years to degrade, may be ingested by animals and humans, and may cause health problems such as cancer. Plastic foams (e.g., polystyrene or Styrofoam) are ubiquitously used as packaging materials and significantly contribute to environmental plastic pollution.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Set forth herein are non-toxic biodegradable foams and methods of foam production that solve the problems associated with conventional plastics and plastic foams. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Figure 1:
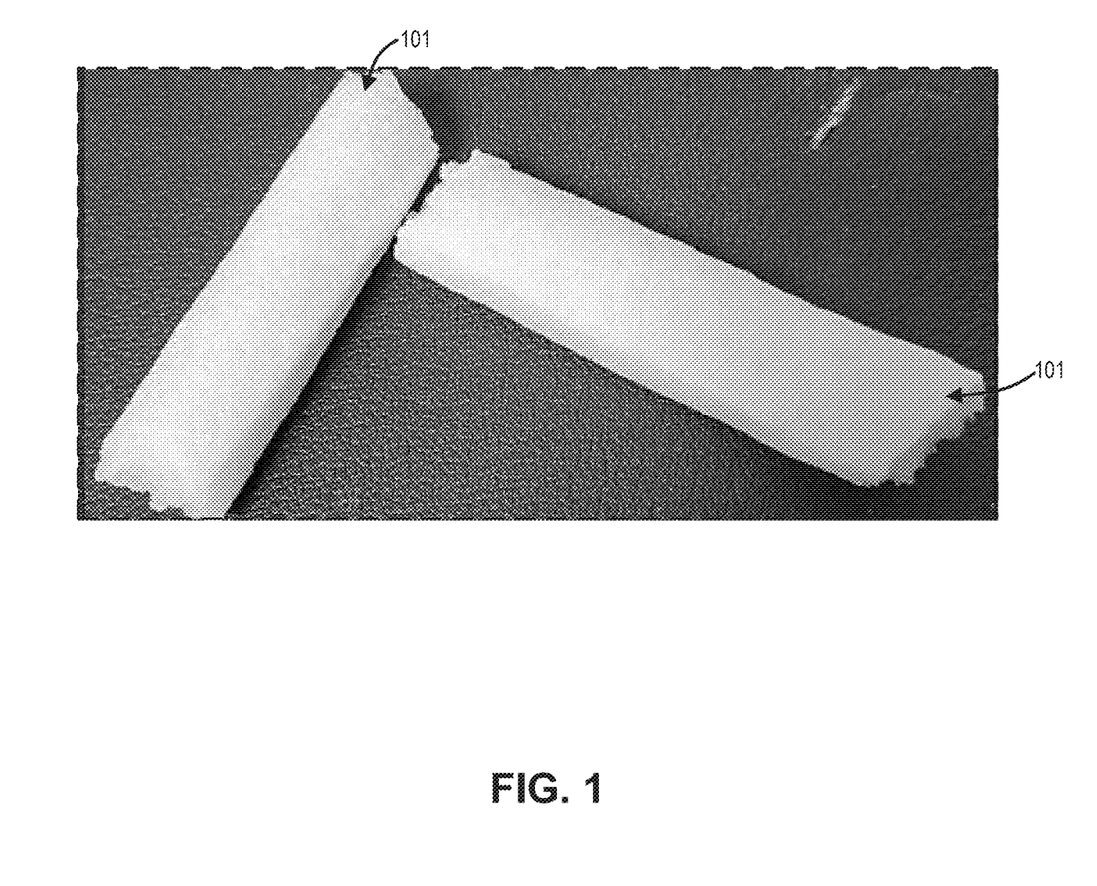
FIG. 1 illustrates an example biodegradable foam sample produced using the ingredients and methods described herein, in accordance with embodiments of the present disclosure.

FIG. 1 illustrates an example biodegradable foam sample 101 produced using the ingredients and methods described herein, in accordance with embodiments of the present disclosure. In several embodiments, the biodegradable foam sample 101 (hereinafter "foam 101") includes starch (e.g., pea starch or corn starch) and urea. In some embodiments, a composition of the foam, by weight percent or volume percent, includes a starch weight percent representative of the starch included in the foam 101 and a urea weight percent representative of the urea included in the foam 101. In one or more embodiments, the starch weight percent is greater than the urea weight percent such that there is more starch by weight in the foam 101 than urea. It is appreciated that urea may improve processing, flexibility, compressibility, resilience, friability, fire retardancy, and water resistance. Urea, which is biodegradable and abundant in nature, is a colorless and odorless solid, highly soluble in water, and practically non-toxic. It is used as fertilizer and can be beneficial for plants. In some embodiments, urea may be added from close to 0% to 50% by weight of the foam. The urea is a dry solid that may be blended into the starch prior to extrusion or added by another feeder simultaneously during the extrusion process. However, the urea may also or alternatively be introduced into production equipment in other methods, in accordance with the embodiments of the present disclosure. In some embodiments, the foam 101 may include other plasticizers such as glycerol, sorbitol, or water, which may be used in combination with urea. Furthermore, other additives such as salts may be included in the foam 101 that work synergistically with the urea in the foam.

In some embodiments, the foam 101 may include the urea at a urea weight percent from greater than 0% (e.g., 0.1% or greater) to 50%, which may be adjusted to modulate the compressive strength of the foam 101. In some embodiments the urea weight percent may give the foam 101 a reduced compressive strength and an ability to rebound after compression. Additionally, the urea may also allow for less water to be used during production of the foam 101. In some embodiments the urea weight percent is from 10% to 15%, which can decrease the compressive strength of the foam 101 to give the foam 101 a performance similar to expanded polyethylene foam. In some embodiments, the urea increases the tensile strength of the foam 101. It has been found that the urea can increase the tensile strength of the foam 101 to be up to 3 times greater than expanded polystyrene foam (see, e.g., FIG. 2). Moreover, in some embodiments, the urea included in the foam 101 provides significant fire retardant effects when the urea weight percent is greater than 10% when used with starch. In particular, the starch and urea included in the foam 101 self-extinguishes after flame is applied while starch-based foams without urea will burn until extinguished.

Figure 2:
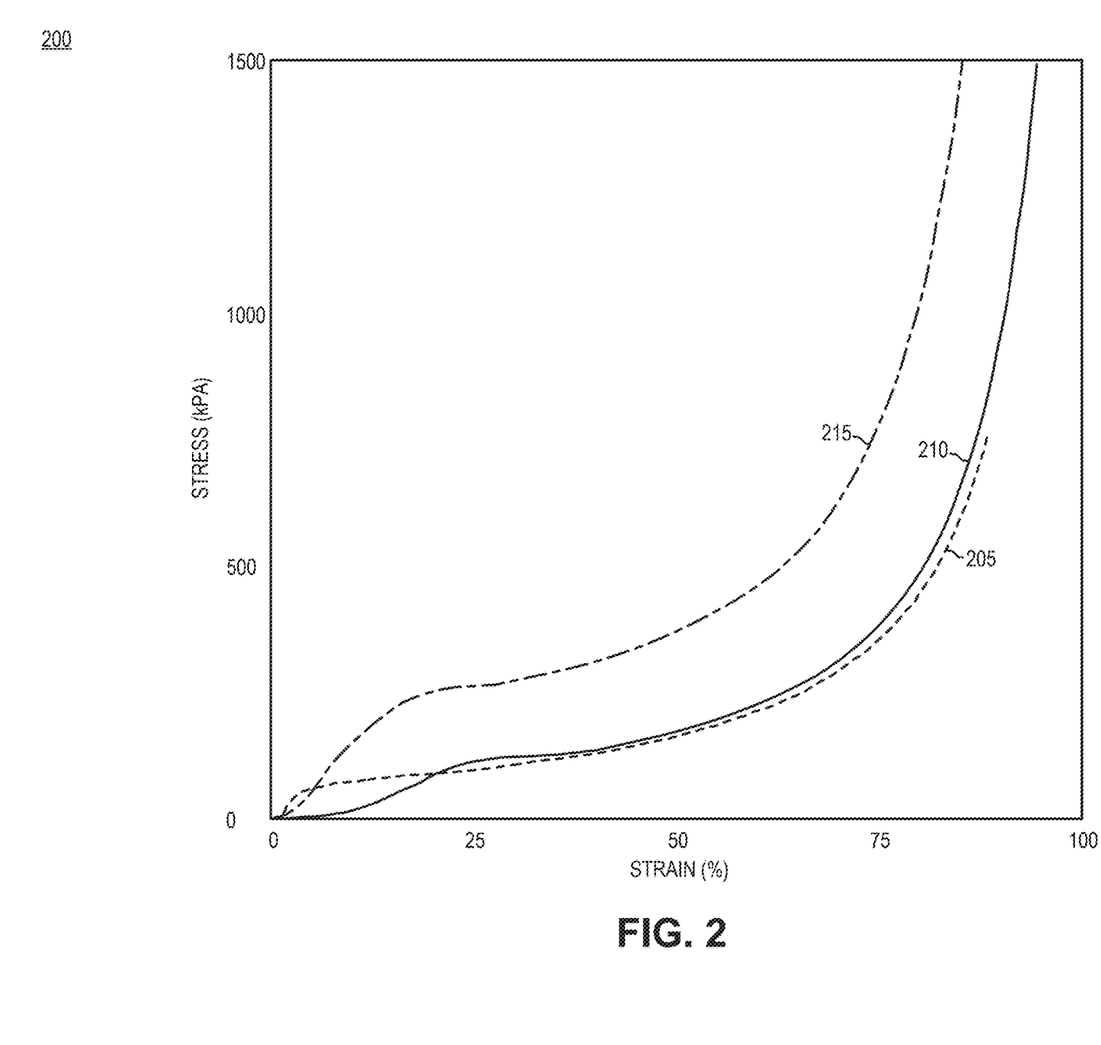
FIG. 2 illustrates example compression curve data of an expanded polystyrene foam compared to the biodegradable foam sample of FIG. 1, in accordance with embodiments of the present disclosure.

FIG. 2 illustrates example compression curve data 200 of an expanded polystyrene foam compared to the biodegradable foam sample of FIG. 1, in accordance with embodiments of the present disclosure. In particular, line 205 shows a stress-strain curve for expanded polystyrene foam. Line 210 shows a stress-strain curve for an instance of the foam 101 with a urea weight percent from 10% to 15%, which has similar mechanical properties as that of the expanded polystyrene foam represented by the line 205 while line 215 shows a stress-strain curve for an instance of the foam 101 with a greater urea weight percent than line 210.

In one embodiment, the foam 101 includes calcium carbonate. In the same embodiment, the composition of the foam 101 further includes a calcium carbonate weight percent representative of the calcium carbonate included in the foam 101. In some embodiments, the starch weight percent is greater than the calcium carbonate weight percent such that there is more starch by weight in the foam 101 than the calcium carbonate. In one embodiment the foam 101 includes glycerol. In the same embodiment, the composition of the foam 101 further includes a glycerol weight percent representative of the glycerol included in the foam 101. In some embodiments, the starch weight percent is greater than the glycerol weight percent such that there is more starch by weight in the foam 101 than the glycerol. In one embodiment, the foam 101 includes glycerol monostearate. In the same embodiment, the composition of the foam further includes a glycerol monostearate weight percent representative of the glycerol monostearate included in the foam 101. In one embodiment, the starch weight percent is greater than the glycerol monostearate weight percent such that there is more starch by weight in the foam than the glycerol monostearate. In one embodiment, the foam 101 includes chitosan. In the same embodiment, the composition of the foam 101 further includes a chitosan weight percent representative of the chitosan included in the foam. In one embodiment, the starch weight percent is greater than the chitosan weight percent such that there is more starch by weight in the foam 101 than the chitosan. In some embodiments, the urea weight percent is greater than one or more of the calcium carbonate weight percent, the glycerol weight percent, the glycerol monostearate weight percent, or the chitosan weight percent such that there is more urea in the foam 101 by weight than the calcium carbonate, the glycerol, the glycerol monostearate, or the chitosan. In some embodiments the urea weight percent is greater than the weight percent of any other component included in the foam 101 but for the starch weight percent such that there is more urea in the foam 101 by weight than all of the other ingredients in the foam 101 other than starch. In one embodiment, the chitosan weight percent is greater than the calcium carbonate weight percent such that there is less of the calcium carbonate in the foam 101 by weight than the chitosan. In one embodiment, the chitosan weight percent is greater than the glycerol weight percent and the glycerol monostearate weight percent such that there is less glycerol and glycerol monostearate in the foam 101 than chitosan by weight.

In one embodiment, the composition of the foam 101 may include starch with the starch weight percent from 40% to 98%, glycerol with the glycerol weight percent from greater than 0% to 20%, glycerol monostearate with the glycerol monostearate weight percent from greater than 0% to 10%, and urea with the urea weight percent from greater than 0% to 40%. In some embodiments, one or more of the glycerol, glycerol monostearate, or urea may be omitted. In the same or other embodiments, the weight percent may be replaced or otherwise determined by a volume percent of the foam 101. In one embodiment, the ingredients fed into an extruder for forming the foam 101 may include, for example, the starch with starch weight percent from 40% to 70%, urea with the urea weight percent from 0.5% to 15%, glycerol with the glycerol weight percent from 1% to 10%, acetic acid with an acetic acid weight percent from 0.04% to 1%, and chitosan with the chitosan weight percent from 0.05% to 5%. Additionally, it is appreciated that example formulations of the foam 101 may include from 4% to 25% total water due, at least in part, to inherent moisture included in the starch and other ingredients. In some formulations, the foam 101 includes a glycerol monostearate with the glycerol monostearate weight percent from 0.3% to 2%. In the same or other embodiments, the foam 101 may include an endothermic blowing agent with a blowing agent weight percent from 0.5% to 3%. In the same or other embodiments, certain formulations for the foam 101 include a small amount of a mineral nucleator having a nucleator weight percent up to 2%. In some embodiments, greater amounts of the chitosan may be used to offset some of the starch.

In one embodiment, the foam 101 may include one or more salts. In one embodiment, the one or more salts include ammonium salts (e.g., choline chloride) and/or sodium salts (e.g., sodium borate or sodium bicarbonate). It is appreciated that the one or more salts may also act as plasticizers, starch retrogradation inhibitors, and processing aids. In some embodiments, the one or more salts may perform similar effects to the urea and other plasticizers. It is appreciated that certain salts included in the one or more salts can form complexes with the urea. In one embodiment, a quaternary ammonium salt combined with a metal salt or hydrogen bond donor can form a deep eutectic solvent. For example, a combination of choline chloride and urea creates a deep eutectic solvent.

However, other combinations of salts with urea are not generally recognized as distinct chemical products, rather mixtures of the constituents. For example, a combination of calcium carbonate and urea is referred to as a mixture of the two because calcium carbonate and urea do not form a complex like choline chloride and urea.

In addition to plasticizing effects, the one or more salts can prevent the retrogradation of the starch. Retrogradation is a reaction that occurs when gelatinized starch molecules realign. Gelatinized starch molecules are amorphous while aligned starch molecules are crystalline. Amorphous starch lends itself to pliability and flexibility while crystalline starch is rigid and brittle. In some embodiments one or more dyes (e.g., food coloring) may be added to the foam 101 to impart color to the foam 101.

Figure 3A:
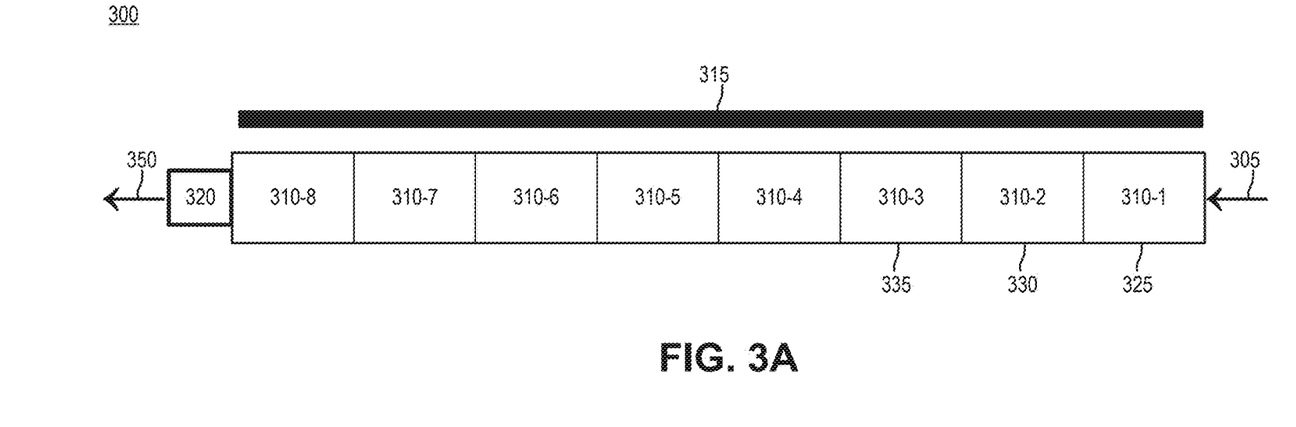
FIG. 3A illustrates an example schematic for fabricating biodegradable foam using an extruder, in accordance with embodiments of the present disclosure.

FIG. 3A illustrates an example schematic for fabricating biodegradable foam using an extruder 300, in accordance with embodiments of the present disclosure. In some embodiments biodegradable foam (e.g., the foam 101 illustrated in FIG. 1) may be made through the process of extrusion using the extruder 300. Extrusion is a process used to create objects by pushing material through a die of a desired cross-section shape and size. Extrusion creates excellent surface finish of the foam and gives considerable freedom of form in the design process. In some embodiments, extrusion may be continuous (e.g., theoretically producing indefinitely long material) or semi-continuous (e.g., producing many pieces). Products of extrusion are generally called extrudates.

In the example block diagram of the extruder 300 illustrated in FIG. 3A, includes a plurality of modules 310 (e.g., a first module 310-1, a second module 310-2, a third module 310-3, and so on). It is appreciated that the plurality of modulates 310 are not intended to be limiting as there may be more or less modules than the illustrated eight modules (e.g., 310-1 through 310-8). Additionally, it is noted that while the plurality of modules 310 are arranged in sequential order, there may be additional modules between adjacent modules, in some embodiments. For example, in one embodiment there may be one or more modules included in the plurality of modules between the second module 310-2 and the third module 310-3. In the illustrated embodiment, one or more materials are input into the extruder 300 for forming a foam (e.g., the foam 101 illustrated in FIG. 1), which flow along the extruder 300 in the direction of the arrow 305 until an extrudate 350 corresponding to the foam is output. More specifically, the materials for forming the foam flows in the from a first end (e.g., proximate to the first module 310-1, the second module 310-2, and/or the third module 310-3) of the extruder 300 toward the second end of the extruder 300 (e.g., proximate to a die 320 of the extruder 300) opposite the first end of the extruder 300. In some embodiments, the first module 310-1 is configured to provide a vent to atmosphere, the second module 310-2 is configured to input one or more solid feeds (e.g., solid components to feed into the extruder 300 one or more of starch, glycerol monostearate, endothermic blowing agents such as a mixture of sodium bicarbonate and citric acid, calcium carbonate nucleator, urea, glycerol, chitosan, and/or any of solid material included in the composition of the foam), and the third module 310-3 is configured to input one or more liquid feeds (e.g., liquid components to feed into the extruder 300 one or more of water, acetic acid, or any other liquids included in the foam or otherwise utilized to form the foam). In some embodiments, the second module 310-2 may be referred to as a solid input and the third module 310-3 may be referred to as a liquid input. As illustrated, the third module 310-3 is disposed between the second module 310-2 and the second end of the extruder 300. Additionally, the third module 310-3 is disposed between the first end and the second end of the extruder 300. In some embodiments, the liquid components includes an aqueous acid solution (e.g., an acid diluted in water) and the solid components include a base (e.g., sodium bicarbonate, calcium bicarbonate, and so on). In some embodiments, the base reacts with the aqueous acid solution to form one or more salts included in the foam.

In some embodiments, the extruder 300 may be a twin screw extruder and the barrel (e.g., the plurality of modules 310) of the extruder 310 may be heated between the first end and the second end (e.g., via heater 315). As illustrated, the mixture of components proceeded through the plurality of modules 310 may form the foam, which is passed through the die 320 proximate to the second end of the extruder 300 to impart a cross sectional shape to the foam.

Figure 3B:
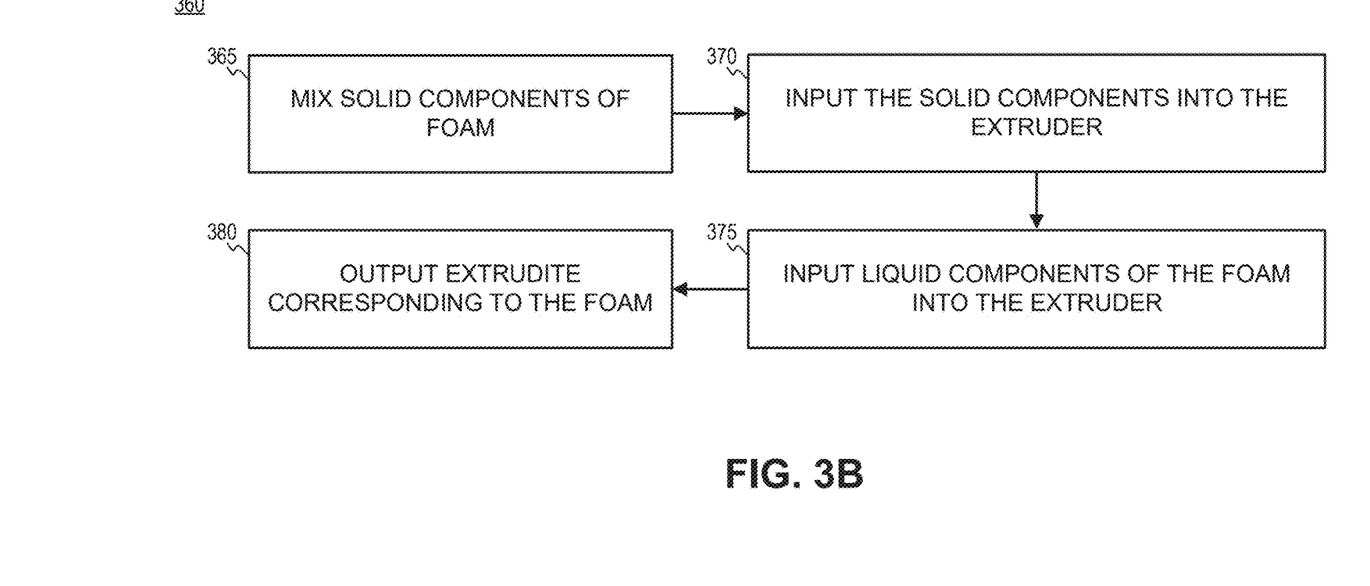
FIG. 3B illustrates an example method for fabricating a biodegradable foam using an extruder, in accordance with embodiments of the present disclosure.

FIG. 3B illustrates an example method 360 for fabricating a biodegradable foam using an extruder, in accordance with embodiments of the present disclosure. The example method includes process blocks 365, 370, 375, and 380. It is appreciated that while the process steps of the method 360 illustrated in FIG. 3B are provided in a specific order, in other embodiments a different order of steps 365, 370, 375, and 380 may be utilized. Additionally, process steps may be added to, or removed from, the method 360 in accordance with the embodiments of the present disclosure. It is further appreciated that the method 300 is one possible way of forming biodegradable foams (e.g., the foam 101 illustrated in FIG. 1 with the extruder 300 illustrated in FIG. 3A), in accordance with embodiments of the present disclosure.

Block 365 illustrates mixing solid components of the foam (e.g., to form a homogeneous mixture of the solid components). In some embodiments, some or all of the solid components are mixed prior to input into the extruder. In one embodiment starch and urea are mixed before input into the extruder.

Block 370 shows inputting the starch into a first end of the extruder (e.g., into the solid feed corresponding to the second module 310-2), inputting the urea into the first end of the extruder (e.g., into the solid feed corresponding to the second module 310-2). In some embodiments, calcium carbonate is input into the first end of the extruder (e.g., into the solid feed corresponding to the second module 310-2). In the same or other embodiments, the amount of starch and calcium carbonate fed into the extruder during the block 370 is selected so that the foam has the starch weight percent greater than the calcium carbonate weight percent such that there is more starch by weight in the foam than the calcium carbonate. In some embodiments, glycerol is input into the first end of the extruder (e.g., into the solid feed corresponding to the second module 310-2). In other embodiments, the glycerol is input during the block 375 (e.g., into the liquid feed corresponding to the third module 310-3). In the same or other embodiments, the amount of glycerol input into the first end of the extruder is selected so that the foam has the starch weight percent greater than the glycerol weight percent such that there is more starch by weight in the foam than the glycerol. In some embodiments, glycerol monostearate is input into the first end of the extruder (e.g., into the solid feed corresponding to the second module 310-2). In the same or other embodiments, the amount of glycerol monostearate is selected so that the foam has the starch weight percent greater than the glycerol monostearate weight percent such that there is more starch by weight in the foam than the glycerol monostearate. In some embodiments chitosan is input into the first end of the extruder (e.g., into the solid feed corresponding to the second module 310-2). In the same or other embodiments, the amount of chitosan is selected so that the foam has the starch weight percent greater than the chitosan weight percent.

In some embodiments, the urea weight percent is greater than one or more of the calcium carbonate weight percent, the glycerol weight percent, the glycerol monostearate weight percent, or the chitosan weight percent. In some embodiments, the chitosan weight precent is greater than the calcium carbonate weight percent. In some embodiments, all of the ingredients described herein may be mixed prior to being inserted into the extruder, while in other embodiments only some of the ingredients may be mixed before entering the extruder, or none of the ingredients may be mixed prior to entering the extruder and may be fed individually into the extruder.

Block 375 illustrates inputting liquid components of the foam into the extruder (e.g., at the first end corresponding to or otherwise including the third module 310-3). In some embodiments water is input into the first end of the extruder (e.g., into the liquid feed corresponding to the third module 310-3). In one embodiment acid (e.g., acetic acid, hydrochloric acid, or the like) is input into the first end of the extruder (e.g., into the liquid feed corresponding to the third module 310-3) along with the water to form an aqueous acidic solution. In some embodiments the water and acetic acid may be mixed before entering a liquids feed (i.e., the input into the third module 310-3) proximate to the first end of the extruder. As shown in FIG. 3A, in some embodiments, the liquid feed input (e.g., the third module 310-3) for the liquid components of the foam is disposed closer to the second end of the extruder than the solid feed input (e.g., the second module 310-2).

Block 380 shows outputting the extrudate 350 corresponding to the foam, which includes the starch and the urea, from the second end (e.g., end of the extruder 300 proximate to the die), opposite the first end of the extruder 300. In some embodiments the foam has a density of less than one g/cm³. In the same or other embodiments, the amount of starch and urea fed into the extruder 300 during the block 370 is selected so the foam has the starch weight percent greater than the urea weight percent such that the foam has more starch than urea by weight.

In some embodiments the starch included in the foam (e.g., the foam 101, the foam formed by the extruder 300, and/or the foam formed by the process 360) may be cornstarch or pea starch, selective of which may be based on sourcing, price, and/or mechanical performance. In the same or other embodiments, the foam may have a starch weight percent of 40% to 99%, a urea weight percent of 0% to 40%, a calcium carbonate weight percent of 0% to 5% by weight, a glycerol weight percent of 0% to 20%, a glycerol monostearate weight percent of 0% to 10%, and a urea weight percent of 0% to 40%. In some embodiments, the weight percent of the various components included in the foam may be substituted by volume percent.

Figure 4:
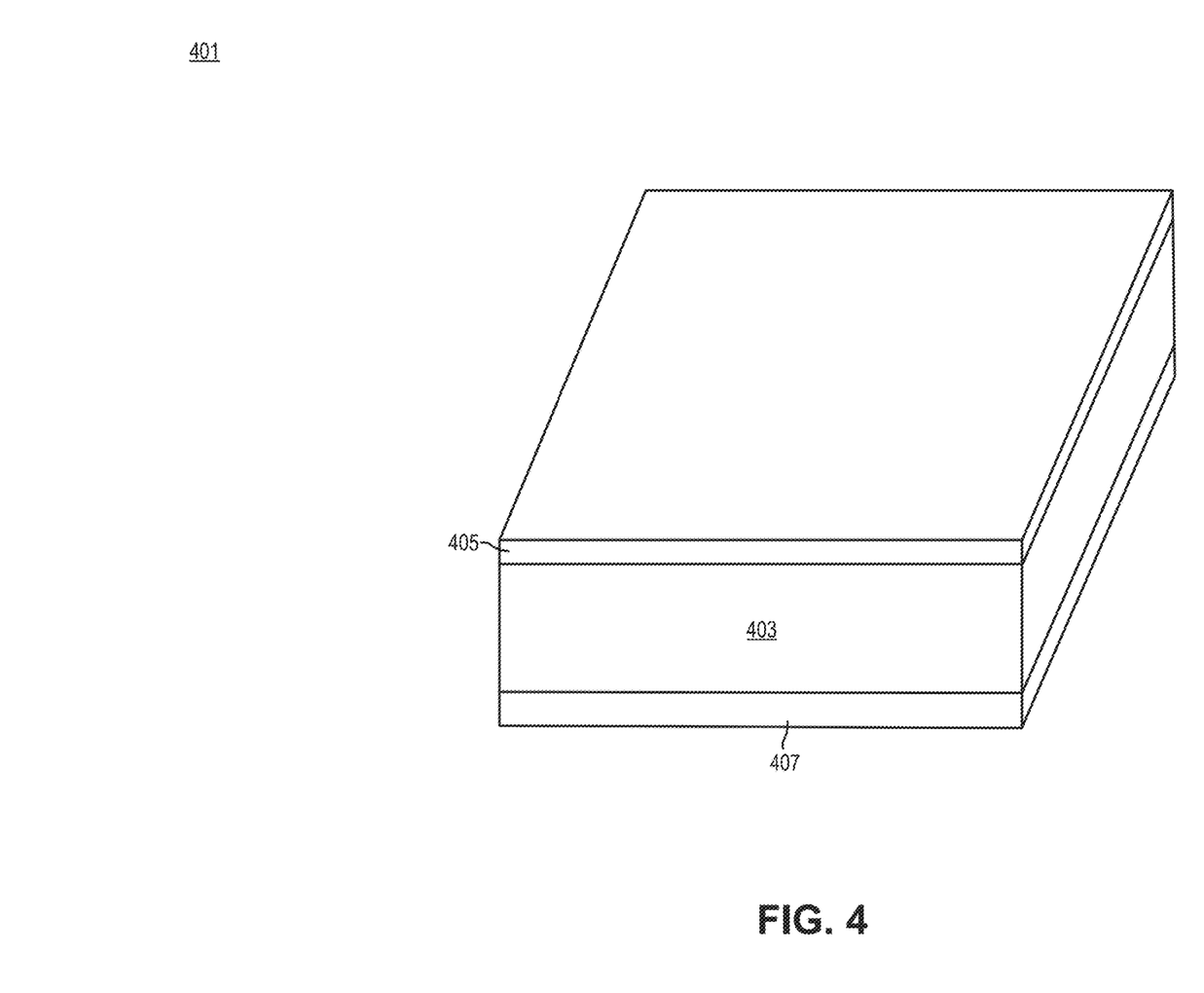
FIG. 4 illustrates an example composite foam with laminates, in accordance with embodiments of the present disclosure.

FIG. 4 illustrates an example composite foam 401 with laminates, in accordance with embodiments of the present disclosure. More specifically, the composite foam 401 includes foam 403 (e.g., corresponding to the foam 101 illustrated in FIG. 1, a foam fabricated with the extruder 300 illustrated in FIG. 3A, and/or a foam fabricated with the method 360 illustrated in FIG. 3B) disposed or otherwise centered between laminates (e.g., a first laminate 405 and a second laminate 407) disposed on either side of the foam 403, in accordance with an embodiment of the disclosure. In some embodiments, the foam 403 is porous. In some embodiments the first laminate 405 and the second laminate 407 are biodegradable. In some embodiments, the first laminate 405 and the second laminate 407 comprise one or more of paper (e.g., cellulose fiber) and natural fiber textiles. In the same or other embodiments, the first laminate 405 and the second laminate 407 may include foil, cloth (e.g., cotton, fiberglass, etc.), wax or the like. In the depicted embodiment, the foam 403 is shaped as a sheet disposed between one or more laminate layers (e.g., the first laminate 405 and the second laminate 407) adhered to opposite sides of the foam 403 (e.g., a first side and a second side opposite of the first side). In some embodiments, only one side of the foam 403 may be adhered to a laminate (e.g., one of the first laminate 405 or the second laminate 407 maybe omitted), while one or more other sides of the foam 403 may be exposed. However, in other embodiments, as many as all sides of the foam 403 may be covered with laminate (e.g., the foam 403 may be encapsulated by laminates).

In some embodiments, the foam 403 may have a single composition or may include multiple layers with different compositions that are attached or adhered together. Similarly, one or more layers of laminates, with different material compositions, can be applied to either or both sides of foam 403 in any order. It is appreciated that the foam 403 may not necessary be planar, and make take other shapes, in accordance with embodiments of the present disclosure. In some embodiments, the composition of the foam 403 composition may be those described elsewhere herein. In some embodiments, the laminates (e.g., the first laminate 405 and the second laminate 407) may be adhered to the foam 403 with wood glue, chitosan solution, or the like. In some embodiments, the laminates may be applied to the foam 403 after extrusion in a continuous manner (e.g., with rollers or the like as shown in FIG. 5).

Figure 5:
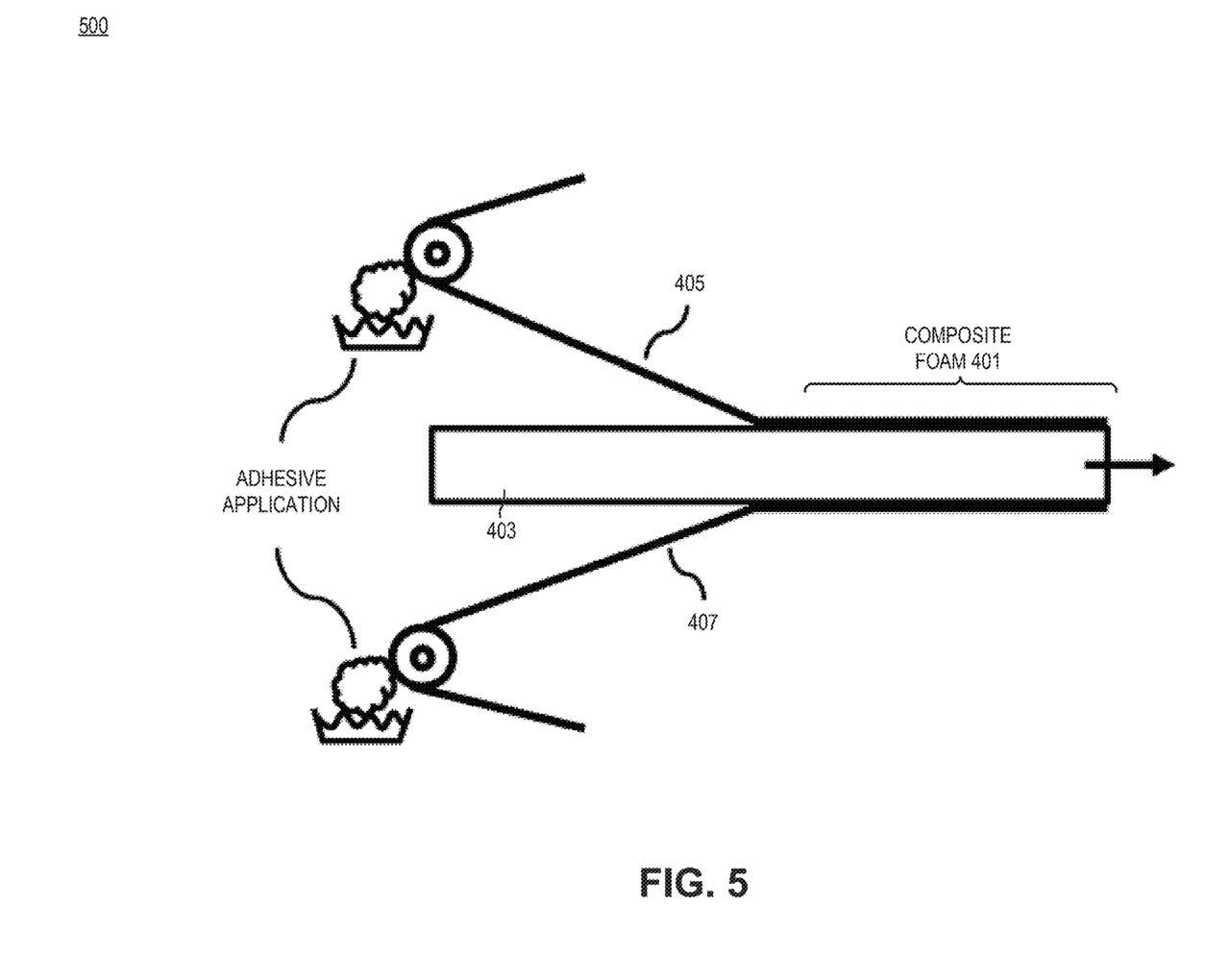
FIG. 5 illustrates an example corrugator machine for producing the composite foam of FIG. 4, in accordance with embodiments of the present disclosure.

FIG. 5 illustrates an example corrugator machine 500 for producing the composite foam 401 of FIG. 4, in accordance with embodiments of the present disclosure. Manufacturing of the foam 403 may be adapted into corrugator machinery by substituting each component in corrugator machinery for the components needed to fabricate the composite foam 403 (e.g., to adhere the first laminate 405 and the second laminate 407 to the foam 403 to form the composite foam 401).

In the embodiment depicted in FIG. 5, the first laminate 405 and the second laminate 407 are being applied to both sides of a sheet of the foam 403 as it is being pulled or pushed through corrugator-like machinery. Adhesive is applied continuously to inner surfaces (e.g., surfaces of the first laminate 305 and the second laminate 307 proximate to or otherwise to be in direct contact with the foam 403) of the first laminate 305 and the second laminate 307 (e.g., with rollers, sponges, or the like from adhesive reservoirs). In this way there is continuous throughput of the composite foam 401. Accordingly, the foam 403 may be produced via extrusion and passed directly into the corrugator type equipment to form the composite foam 401. Thus, the composite foam 401 may be continuously produced, reducing cost of the final product, and providing cost-effective biodegradable packaging.

The composite foam material 401 may be a sheet (e.g., a meter or more wide and several millimeters to tens of centimeters thick), which can further be folded into a tray or a box. In some embodiments, the composite foam 401 may include the foam 403 fully encapsulated by laminates (e.g., the first laminate 305 and the second laminate 307) along with edges of the composite foam 401 covered by additional laminates. However, in other embodiments, only one side of foam 403 may be covered with the laminate, or the edges may be covered or uncovered.

The above description of illustrated embodiments of the invention, including what is described in the Abstract, is not intended to be exhaustive or to limit the invention to the precise forms disclosed. While specific embodiments of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A foam, comprising:
    starch;
    urea, wherein a composition of the foam is characterized by a starch weight percent representative of the starch included in the foam and a urea weight percent representative of the urea included in the foam, and wherein the starch weight percent is greater than the urea weight percent; and glycerol, glycerol monostearate, and chitosan, wherein the composition of the foam is further characterized by a glycerol weight percent, a glycerol monostearate weight percent, and a chitosan weight percent respectively representative of the glycerol, glycerol monostearate, and chitosan included in the foam, wherein the urea weight percent is greater than the glycerol weight percent, the glycerol monostearate weight percent, and the chitosan weight percent, and wherein the urea weight percent is greater than 10%.

2. The foam of claim 1, wherein the chitosan weight percent is greater than at least one of the glycerol weight percent or the glycerol monostearate weight percent.

3. The foam of claim 1, further comprising calcium carbonate, wherein the composition of the foam is further characterized by a calcium carbonate weight percent representative of the calcium carbonate included in the foam, and wherein the starch weight percent is greater than the calcium carbonate weight percent.

4. The foam of claim 1, wherein the starch weight percent is from 40% up to 98%, the urea weight percent is up to 40%, the glycerol weight percent is from 1% up to 20%, the glycerol monostearate weight percent is 0.3% up to 10%, and the chitosan weight percent is from 0.05% up to 5%.

5. The foam of claim 1, wherein the chitosan weight percent is greater than the glycerol weight percent and the glycerol monostearate weight percent.

6. The foam of claim 1, further comprising one or more salts.

7. The foam of claim 6, wherein the one or more salts include at least one of an ammonium salt or a sodium salt.

8. The foam of claim 7, wherein the ammonium salt includes choline chloride, and wherein the sodium salt includes at least one of sodium borate or sodium bicarbonate.

9. The foam of claim 1, further comprising at least one of a dye to impart color to the foam or a laminate adhered to one or more sides of the foam.

10. A method of foam manufacturing, comprising:

inputting starch, urea, glycerol, glycerol monostearate, and chitosan into an extruder proximate to a first end of the extruder; and outputting, from a second end of the extruder different than the first end, a foam formed from the starch, urea, glycerol, glycerol monostearate, and chitosan, wherein the foam has a density of less than one $g/cm^3$, wherein a composition of the foam is characterized by a starch weight percent, a urea weight percent, a glycerol weight percent, a glycerol monostearate weight percent, and a chitosan weight percent respectively representative of the starch, urea, glycerol, glycerol monostearate, and chitosan included in the foam, wherein the starch weight percent is greater than the urea weight percent of the urea, wherein the urea weight percent is greater than the glycerol weight percent, the glycerol monostearate weight percent, and the chitosan weight percent, and wherein the urea weight percent is greater than 10%.

11. The method of claim 10, wherein the starch weight percent is greater than each of the glycerol weight percent, glycerol monostearate weight percent, and chitosan weight percent.

12. The method of claim 10, wherein the chitosan weight percent is greater than at least one of the glycerol weight percent or the glycerol monostearate weight percent.

13. The method of claim 10, further comprising inputting calcium carbonate into the extruder, wherein the composition of the foam is further characterized by a calcium carbonate weight percent representative of the calcium carbonate included in the foam, wherein the starch weight percent is greater than the calcium carbonate weight percent, and wherein the chitosan weight percent is greater than the calcium carbonate weight percent.

14. The method of claim 10, wherein the chitosan weight percent is greater than the glycerol weight percent and the glycerol monostearate weight percent.

15. The method of claim 10, further comprising inputting an aqueous acidic solution into a liquid input disposed between the first end and the second end of the extruder, wherein the aqueous acidic solution includes the chitosan.

16. The method of claim 15, further comprising inputting a base into the extruder, wherein the base reacts with the aqueous acidic solution to form one or more salts included in the foam.

* * * * *